March 15, 1932.   E. URBAIN   1,849,648
TREATMENT OF GASES AND THE LIKE
Filed April 29, 1924   3 Sheets-Sheet 1
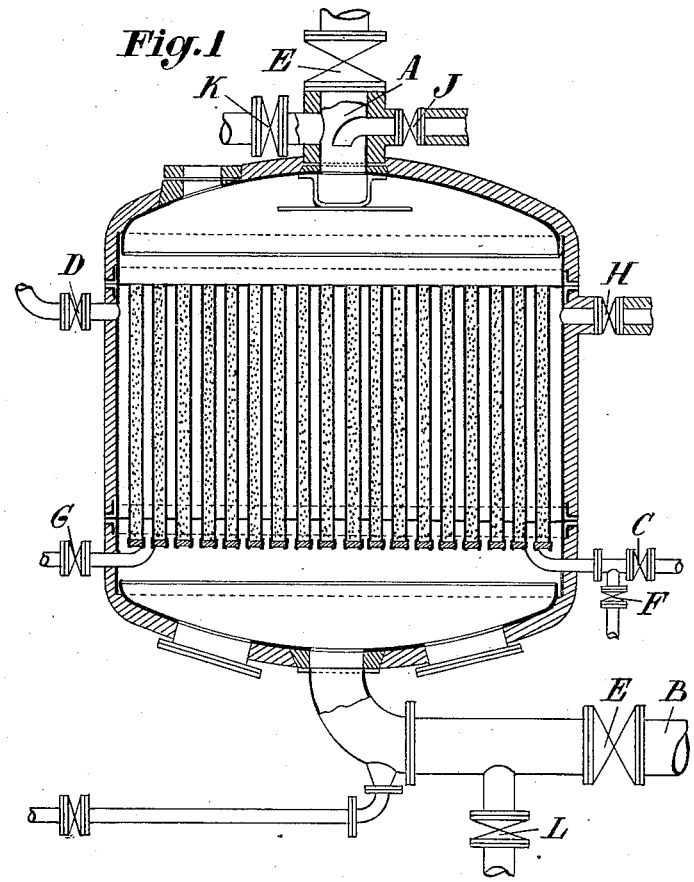
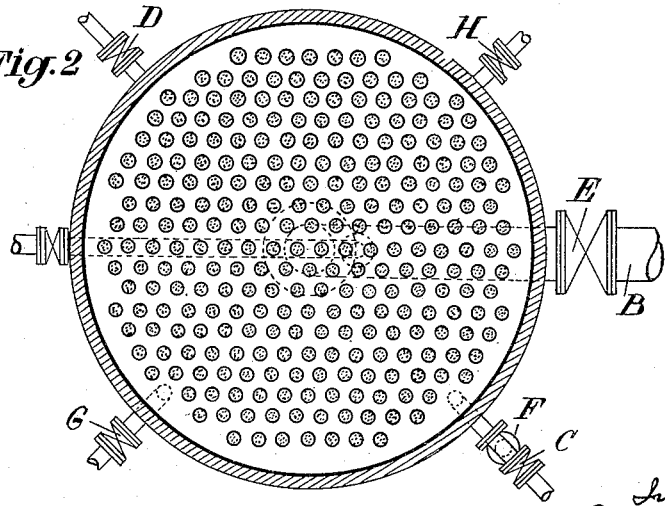
Inventor
Edouard Urbain
By Edward C. Sacnett
Attorney.

March 15, 1932. E. URBAIN 1,849,648
TREATMENT OF GASES AND THE LIKE
Filed April 29, 1924 3 Sheets-Sheet 2

Inventor
Edward Urbain
By Edward C. Sasnett
Attorney.

March 15, 1932.  E. URBAIN  1,849,648
TREATMENT OF GASES AND THE LIKE
Filed April 29, 1924   3 Sheets-Sheet 3

Inventor
Edouard Urbain
By Edward C. Sasnett
Attorney.

Patented Mar. 15, 1932

1,849,648

UNITED STATES PATENT OFFICE

EDOUARD URBAIN, OF PARIS, FRANCE, ASSIGNOR, BY MESNE ASSIGNMENTS, TO COMPAGNIE DES PRODUITS CHIMIQUES ET CHARBONS ACTIFS ED. URBAIN, OF PARIS, FRANCE, A CORPORATION OF FRANCE

TREATMENT OF GASES AND THE LIKE

Application filed April 29, 1924, Serial No. 709,886, and in France July 13, 1923.

This invention relates to processes for the separation of hydrocarbons from distillation gases and the like, for the recovery of volatile solvents etc. contained in air or other gases and generally for the selective adsorption of all gases etc., utilizing highly absorbing (sometimes called "active") carbonaceous materials, or other absorbent or adsorbent solid substances having similar properties.

The apparatus which have been used hitherto in connection with such processes are ordinary cylindrical or other vessels filled with the absorbent material through which the gases to be treated are passed. The absorbed products are separated by means of steam, superheated or not, which is brought into direct contact with the absorbent material. If necessary, the latter is afterwards dried also by direct contact with a current of air or gases which have been previously heated and it is cooled by means of cold air or gases.

One of the objects of the invention is to replace completely or partially, the processes described in the preceding paragraph by the indirect heating and cooling of the absorbent material, either with superheated or non-superheated steam, with hot or cold air or gases, with water or any other liquid or by means of refrigerating mixtures or in any other way.

Another object of the present invention is to regulate the temperature of the absorbent material while absorption is taking place, as such regulation increases its absorbing capacity and is of very great importance in connection with the recovery of certain highly volatile products or of products the adsorption of which releases a fairly large amount of heat.

Figure 3:
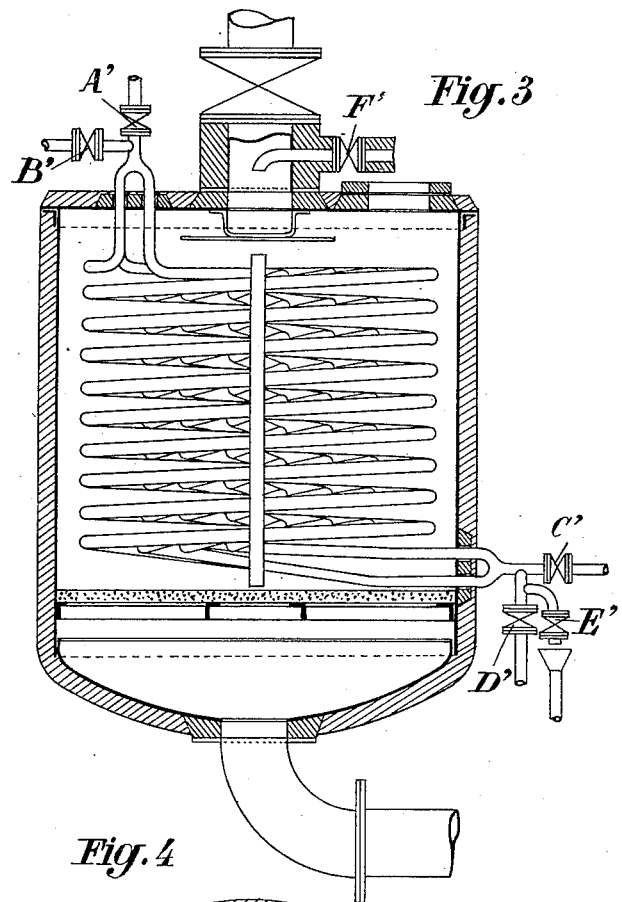
Figure 4:
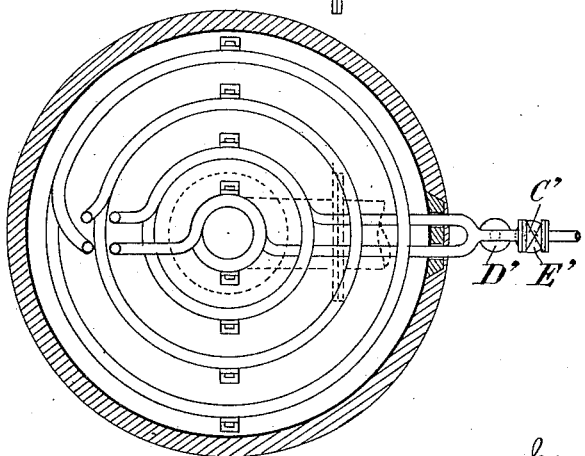
Figure 5:
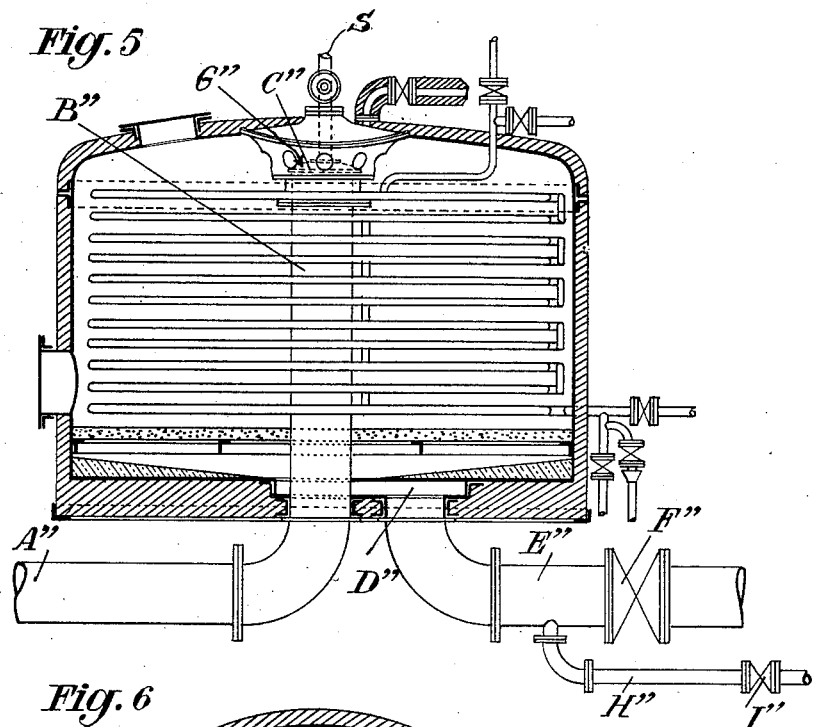
Figure 6:
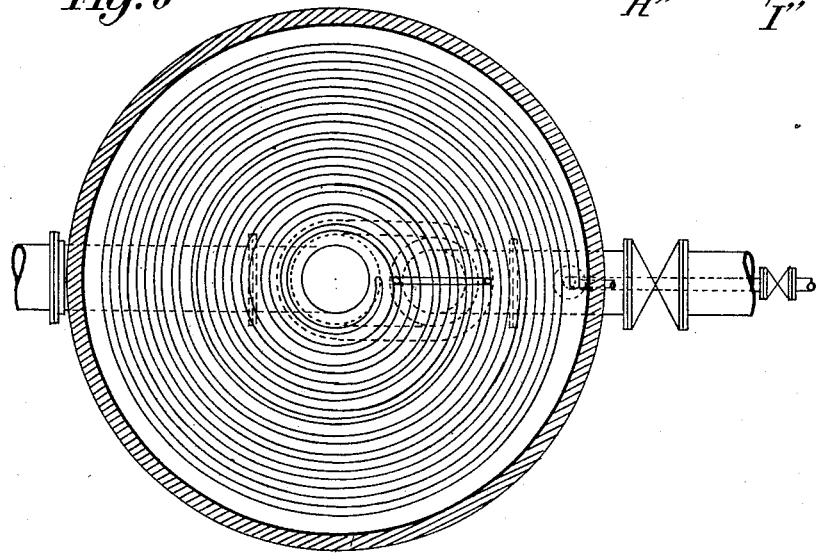

Fig. 1 shows a vertical section of one form of apparatus adapted for use with my process; Fig. 2 is a horizontal section through the center of apparatus shown in Fig. 1; Fig. 3 is a vertical section of a modified form of apparatus; Fig. 4 is a horizontal section through the center of the apparatus shown in Fig. 3; Fig. 5 shows a further modification, in horizontal section, and Fig. 6 is a vertical section through the center of the apparatus shown in Fig. 5.

The apparatus comprises an outer casing and comprises moreover a series of tubes secured to two head plates. The absorbent substance is placed inside the tubes, being for instance supported on porous plugs fitted at the lower ends of the tubes, which plugs afford passage to the gases and may be removed to empty the tubes.

During the periods of absorption, the gases etc. to be treated enter the apparatus at A (Figs. 1 and 2) and leave at B or conversely, and the tubes are cooled, if necessary, by a current of water, air or gases etc., entering at C and leaving at D or vice versa.

Once the desired saturation of the absorbent material is reached, the inlet and outlet valves E are closed. The cooling of the tubes is stopped and if water or other liquid has been used for cooling, it is evacuated through the valve F.

The absorbed products are then separated, either by heating the tubes externally by saturated or superheated steam, or by means of hot gases such as combustion gases etc. entering for instance at G and leaving at H, or by introducing superheated or non-superheated steam inside the tubes through the valve J, or by combining in any way both the above methods.

Should it be necessary to dry or to cool the absorbent material before the apparatus is used again, this can be done either by the usual methods of blowing through the absorbent material hot or cold air or gases entering for instance at L and leaving at K, or by heating or cooling the outside of the tubes containing the said absorbing substance, or by combining in any suitable manner the direct and indirect methods of heating and cooling described above.

The apparatus may also be designed so that the absorbent material is placed outside the tubes; they may be fitted with an external jacket permitting the heating or cooling of the outside of the shell, or they may be constructed in any other way whereby the indirect and direct heating and cooling of the absorbing agent may be effected.

The apparatus may be arranged vertically or horizontally or disposed in any other manner.

Devices may be used to enable the various parts to expand and contract freely.

It may be found necessary in certain cases for the separation of the absorbed products (and this is also part of the present invention) to create a partial or total vacuum inside the apparatus, with or without simultaneous heating of the absorbent material by one of the methods already described or any combination of such methods.

It is sometimes necessary to fractionate the absorbed products. This can be done by using a known rectification column or by any other usual means, but it is frequently more economical to fractionate whilst absorption is taking place.

A further object of the present invention is to effect such fractionating by passing the gases to be treated through several absorbing apparatus disposed in series.

For example the recovery of benzol from coal gas may be effected by passing the gas through two or three apparatus filled with highly absorptive carbonaceous material and disposed in series; the hydrocarbons with the higher molecular weights gradually displace the lighter products and the fractionating takes place automatically.

In some cases, however, in spite of all the improvements so far described, the absorption apparatus do not work satisfactorily owing to the accumulation in the absorbing material of small quantities of heavy hydrocarbons or other bodies, which it is not possible to displace.

One of the objects of the invention is also to prevent such troubles by passing the gases etc. before they enter the absorption apparatus through one or more purifiers filled with ordinary charcoal or the cheaper kinds of absorbing carbonaceous material or with any absorbing substance which will retain the disturbing impurities.

The apparatus shown on Figs. 3 and 4 comprises a coiled pipe of any shape which may be made in several sections and which is embedded in the absorptive material. Superheated or nonsuperheated steam may be passed through the said coil at a suitable pressure, or when necessary water or another liquid may be circulated therein. Steam may also be allowed to enter the apparatus externally to the coil, that is to say the steam is in direct contact with the absorptive material, as it has been found that the accession of steam to the said material is very often extremely advantageous, if not indispensable, for rapidly removing the absorbed substances. This is due to the circumstance that the absorptive power, although decreasing with increasing heat, may still be very marked at temperatures which may be reached in practice. It has been found for example that the retaining power is still fairly high at 250° C.

It is possible to regenerate the absorptive material by producing a partial or total vacuum within the absorption apparatus with or without simultaneous heating, but the same result is obtained (in a simpler way as a rule) by passing steam through the absorbing material. It is however most important not to wet the latter in order that its absorptive power should not be lowered so that care must be taken that no condensed steam remains in the apparatus. Thus steam is very badly utilized when the apparatus and the absorptive material are heated only by direct contact with steam because it is not possible to use latent heat which even with highly superheated steam is considerably higher than superheating heat. It is therefore desirable to keep the absorptive material dry and to save fuel by indirectly heating the apparatus and its contents (before heating by steam directly) to a temperature at which condensation does not occur, so that only the strictly necessary volume of directly heating steam is used for removing the absorbed substances.

Indirect heating may be effected in certain cases by means of gases still containing perceptible heat, such as combustion or other gases supplying heat at a very low cost. In this case it is of advantage to use a tube apparatus similar to that shown on Figs. 1 and 2, but when steam is available (as is frequently the case) matters are simplified by using the apparatus shown on Figs. 3 and 4.

Owing to the very large heating capacity of steam per unit of volume, the steam indirect heating device occupies but very little space and therefore takes up but a small portion of the useful volume of the apparatus. The dimensions of the latter are therefore smaller at equal capacity as compared with a nest of tubes for example; moreover the weight of the metal to be heated is markedly lower. Furthermore, difficulties arising from contraction and expansion are entirely obviated. Finally, the coiled pipe can be very easily removed and replaced at small cost.

No exact data can of course be given as regards the ratio between the heating surface of the coiled tube and the volume of the absorptive material, since this ratio varies in accordance with the nature of the absorptive material and the time available for carrying out the operations. Experiments have shown however that when the absorbent is activated carbonaceous material, the work can be carried out under good conditions with ten square metres of heating surface per cubic metre of carbonaceous material. The spaces between the convolutions of the coil must be rather small, as solid absorbents are bad conductors of heat as a rule.

As previously stated, this coil may also be used for cooling the absorptive material after it has been heated. This operation is very valuable for increasing the absorption efficiency, that is to say the amount of material recovered per unit weight of absorptive material in connection with solvents, gases and other substances the absorption of which markedly decreases with increasing temperature. Absorption is rapidly improved and restored by cooling the absorptive material for example by circulating cold water in the tubes of the apparatus (Figs. 1 and 2) or in the coiled pipe of the apparatus (Figs. 3 and 4). Consequently, the operations may be without disadvantage much more frequent than in non-cooled apparatus or in apparatus cooled by blowing cold air, during which operation the apparatus cannot be in service.

Thus the quantity of recoverable products for a certain weight of absorptive material is very markedly increased. For example, when recovering certain volatile solvents by activated carbonaceous material it is considered that quite satisfactory results are obtained with apparatus at present in use to recover in 24 hours a quantity of solvent equal in weight to 50% or even 25% of the weight of carbonaceous material put in. These figures however may be exceeded to a considerable extent with apparatus worked on indirect cooling.

The apparatus (Figs. 3 and 4) essentially comprises a casing containing the absorptive material which is carried on a perforated or porous support, the gases or the like to be treated traversing the said material upwards for example. The apparatus is cut out of the circuit of gases to be treated by means of valves after the absorptive material reaches the desired degree of saturation. If water is circulated in the coiled pipe during the absorption stage, the said water is stopped by closing the valve D'. The coil is emptied through the drain cock E' and the valve B' is closed. The valve C' is now opened for the purpose of placing the coil in communication with an automatic drain cock and steam under pressure is let in, superheated or not, by opening the valve A'. Steam condenses in the coil and heats the apparatus and its contents. After reaching the desired temperature (above 100° C.) direct contact steam is let in through the valve F' if the extraction is not yet completed. Should the temperature of this steam be above that of the steam in the coil, it is preferable to close the valve A' when direct contact steam is let in. In the opposite case, the valve A' may be left open to the end of the operation. The supply of steam is stopped when the absorptive material is sufficienly exhausted. The valves A' and C' being now closed, water is circulated in the coil (for example upwards) by opening the valves D' and B'. The apparatus may be included again in the circuit of the gases, or a certain period of time may be allowed to elapse before this is proceeded with, according to the nature of the products to be recovered.

In certain cases, such as for example in the treatment of gases highly charged with solvent, it may be useful to continue the circulation of water during the absorption stage, owing to the marked evolution of heat due to absorption.

In other cases, such as for example in the removal of benzol from distillation gas by means of activated carbonaceous material, it is not essential to provide water-circulating means because there is no objection to restarting on a warm filter.

The coiled pipe illustrated in Figs. 3 and 4 is in several sections mounted in parallel, but its construction may of course be any desired.

If the consumption of heat, for example in the form of steam, is to be reduced to a minimum when removing the absorbed products, it is essential that the weight of the apparatus be reduced as much as possible for a given volume, since the heating of the apparatus proper may be an important factor in the consumption of steam. Firstly therefore the dimensions of the apparatus must be such that a minimum surface is to correspond to the necessary volume when the available space, the resistance to be opposed to the passage of the gases and other local circumstances allow it. The apparatus moreover must be as light as possible. Now the stresses on the cover and base of the apparatus may be fairly considerable, either when treating gases under pressure or during the heating stages, when pressures ranging from 0.4 to 0.5 kilograms per square centimetre or more may be prevailing within the apparatus. Thus for apparatus exceeding a certain diameter it has been necessary to reinforce covers and bases very stiffly with sectional iron and otherwise, so that the amount of metal to be heated was considerably increased.

Figs. 5 and 6 show an arrangement whereby the apparatus can be made lighter. To this end, the pipe for the supply or delivery of the gases etc. to be treated is used to form a bracing member between the two ends of the apparatus. A further advantage of this construction is that gases and steam may be very uniformly divided in the said apparatus.

The apparatus essentially comprises a cylindrical casing or receptacle containing the absorptive material and provided for example with a coiled pipe as shown in Figs. 3 and 4. The gases to be treated are supplied for example through the pipe A'' and enter a distribution chamber C″ through the tube B″ which together with the said chamber C″ form a bracing member between the cover and the base of the apparatus. The gases leave the apparatus through the collector D″ connected to the pipe E″.

The apparatus is cut out of the circuit by closing the valves F″ and G″. The valve G″ is shown in the drawings at the upper portion of the tube B″ and may be operated in any desired way as by raising or lowering the stem S. It may also be fitted to the pipe A″, in which case a drain cock is provided for expelling condensation liquid liable to form in the tube B″. The valve I″ is opened when the absorbed substances are removed by heat, so that the products of condensation together with the vapours leave through the pipe H″ connected to a condenser of any type. This condenser may be below the apparatus or at any other level provided that the pressure inside the said apparatus is sufficient to force the vapours and products of condensation to the inlet of the said condenser.

The gases instead of entering the apparatus at A″ and leaving it at E″ may circulate in the opposite direction therein.

The construction according to the present invention is very suitable when the apparatus is disposed in a pit for example. In this case the supply and delivery pipes for the gases etc. may be connected to the upper portion of the apparatus and the distribution chamber is at the foot of the central tube B″. There may be provided in this case for example in the interior of the tube B″, and starting from the base of the apparatus, a pipe for discharging vapours and condensation products, the pressure within the apparatus being used for forcing them to the condenser.

As it is very important, in order to not reduce its absorption capacity, to maintain dry the absorbent material contained in the apparatus, the use of aforesaid devices must be provided for effecting this drying.

Should the proportion of moisture of the absorptive material of an apparatus be too high on account of the absorbed products being removed by steam, or for any other reason, indirect heating of this apparatus is to be maintained or resumed to evaporate water of condensation. The steam thus produced is allowed to escape. The drying operation may be accelerated by passing through the apparatus, while indirect heating is proceeded with, a stream of gas which becomes charged with moisture while it is heated.

If the absorption of the products to be absorbed is difficult when they are hot, a stream of air or any other gas not charged with the products to be absorbed is resorted to, but when absorption is good at the temperature required for drying (this being frequently the case especially when dealing with an absorptive material immediately after extraction by steam), a simpler course is to use the gases to be treated for accelerating the drying of the material.

Referring for example to the removal of benzol from lighting gas with apparatus provided with the indirect steam heating device (Figs. 5 and 6) and filled with activated carbonaceous material, there is no objection to leading the gas again through the apparatus immediately after benzol is removed by steam, and simultaneously heating for a period of time, leaving or introducing steam in the coiled pipe for the purpose of drying the absorptive material.

The heating is stopped when the carbonaceous material is sufficiently dry. Should it now be found useful to cool the apparatus rapidly, the cooling may be accelerated by circulating water in the coiled pipe.

What I claim is:

1. The method of separating absorbed liquids from absorbent carbonaceous material which comprises the steps of heating such carbonaceous material above 100° C. by indirect heat, passing steam through the carbonaceous material while maintaining the temperature above the condensation temperature of the steam, removing residual absorbed material (including absorbed moisture) with indirect heat, and cooling the carbon.

2. The method of separating absorbed liquids from absorbent carbon, which comprises the steps of heating a bed of carbon by indirect heat to a temperature sufficiently high to prevent the condensation of steam, passing steam through the carbon, stopping the inflow of steam, and continuing the heating during the inflow of steam and after the steam is turned off, so that all of the steam passes through the bed of carbon and the latter is left substantially dry.

In testimony whereof I hereunto affix my signature.

EDOUARD URBAIN.